UNITED STATES PATENT OFFICE

1,988,175

INSECTICIDE AND FUNGICIDE AND METHOD OF PRODUCING SAME

David R. Merrill, Long Beach, Calif., assignor to Union Oil Company of California, Los Angeles, Calif., a corporation of California No Drawing. Application November 9, 1931, Serial No. 574,048

8 Claims. (Cl. 167—15)

This invention relates to insecticides and fungicides and is more particularly directed to insecticides applicable to the extermination of the subterranean type of termites which infest wooden structures and cause considerable damage or destruction.

As is well known to entomologists, the subterranean type of termites, or "white ants" as they are sometimes called, depend upon dead wood and moisture for their existence. Consequently, in the inhabited parts of countries infested with termites, the dwellings and other wooden structures form the bulk of dead wood while the moisture is generally supplied by the ground. These subterranean termites built their nests in the ground under the structure and erect tubes of dirt or other available material from the surface of the ground to the wooden portions of the structure in order to be protected from light, and thus free communication is possible from the structure to their nests below the surface of the ground where the moisture is available. In many instances, their detection results due to the presence of these tubes. In other cases, where cracks in the foundation from the ground to the wooden parts are presented, the termites will use these instead of building tubes and, therefore, discovery of their presence by means of the tubes is impossible. These destructive insects usually subsist on the inner portions of the boards or wooden supports, leaving the same as fragile, hollow shells. Consequently, detection is impossible until these insects have eaten their way through a considerable portion of the dwelling, which may eventually fall due to to its weakened condition.

In order to protect the wooden structures against attack of the subterranean type of termite, it has been common practice to spray the ground under the structure with a solution of sodium arsenite. This toxic compound is sufficiently effective, when first applied, to prevent the termites from infesting the ground under the structure, but due to its high solubility in water, the sodium arsenite is gradually leached out of the ground by soil moisture, even though the ground is protected from rains. This leaching action not only reduces the concentration of the solution to a point where it is no longer effective, but it has the further disadvantage of carrying the poison considerable distances through the ground to the root systems of trees, shrubs or other plants in the immediate vicinity of the dwelling and thus destroying them.

It is, therefore, an object of the present invention to provide an insecticide and fungicide which is particularly adapted for exterminating insects such as the subterranean type of termites.

Another object of this invention resides in providing an insecticide which will not be readily carried away by rains nor leached out of the ground by soil moisture. It is, therefore, another object to employ a toxic compound that is highly insoluble in water.

A further object of this invention is to provide an insect eradicator that is specially adapted for spraying, such as an emulsion and, particularly, an emulsion containing asphalt or other petroleum fraction.

It is another object of this invention to provide an insecticide and fungicide and a method of producing the same, said insecticide being composed of an emulsion of the asphalt type capable of holding in suspension a large amount of finely divided water insoluble poison distributed therein.

Another important object resides in producing an asphaltic insecticidal emulsion of the slow breaking type which is readily adapted for admixture with dirt or other aggregate without rapidly breaking when mixed therewith.

The above and other objects and advantages of this invention will be apparent to those skilled in the art from the detailed description included hereafter.

I have discovered that when a finely divided toxic compound which is substantially insoluble in water, such as arsenic trioxide, is mixed with a heavy petroleum fraction, particularly asphalt, and is thereafter emulsified with water, an insecticide is produced which is particularly adapted for combating the subterranean type of termites. Thus with an emulsion of an insoluble poison and asphalt, an insecticide is produced which when applied to the ground under the structure will not be readily leached out of the ground by soil moisture nor washed away by rains and as a result its effect in preventing infestation by termites will be substantially permanent. Furthermore, it may be applied to the ground adjacent to the vicinity of the trees, shrubs and other plants without fear of injury to their root systems, since it is not readily leached and carried through the ground, as in the case of a soluble poison.

I have further discovered that when a slow breaking emulsion is produced, it can be readily mixed with the dirt under the wooden structure without breaking for an appreciable time and thus the toxic compound may be distributed evenly throughout the upper layer of the soil.

In accordance with this invention, a slow breaking emulsion may be produced by first mixing predetermined amounts of finely divided and insoluble toxic substances with heavy petroleum fractions or asphalt and subsequently emulsifying the mixture with water and an emulsifying agent, such as clay.

In the preparation of the emulsion, a steam blown and soft grade of paving asphalt may be used, although petroleum or any of its fractions may be employed. However, the use of asphalt is preferable since when applied to the earth under the structure in sufficient quantities to serve as a binder for the top layer of earth, a coherent layer is formed through which the termites or other pests would have great difficulty in penetrating and, furthermore, the insecticide will not be washed away in case of heavy rains. An asphalt of 80 to 110 penetration at 77° F. as measured according to the method outlined by the American Society of Testing Materials (D-36-26) and a softening point of 110 to 120° F. as measured by the American Society of Testing Materials' Ball and Ring Method (D-5-25) has given satisfactory results.

The toxic substance to be added to the insecticidal emulsion should be substantially insoluble in water. A poison somewhat soluble in water may be used although as previously stated it will not be as effective as a water insoluble poison. The compound which I have found to be most suitable for this purpose is arsenic trioxide, which is relatively insoluble in cold water and thus may be ground and distributed in the emulsion. However, other insoluble or sparingly soluble toxic substances such as Paris green, London purple, or barium carbonate may be used.

The emulsifying agent or stabilizer to be employed in preparing the insecticide should be capable of producing a slow breaking emulsion so that the insecticide may be suitable for cold mixing work, i. e., of such character as to be readily mixed with dirt, sand or other aggregate without breaking and thus give a satisfactory distribution of asphalt through the aggregate. I have found clay to give the best results, although other stabilizers may work equally as well.

In employing the clay, care should be exercised to determine its acidity or alkalinity, it being preferable to add the clay in as neutral condition as possible. Therefore, some clays which are naturally alkaline require neutralization by acid, others by alkali and still others, such as some bentonites, are naturally neutral and may be used as mined. The latter type of clays are preferred.

In choosing the stabilizing agent, care should be used not to employ substances which will react with the insoluble toxic compound to form soluble poisons. Stabilizers of the soap type are not to be employed since these react with the insoluble toxic compounds and form soluble poisons and, as was previously mentioned, the poisons will readily leach through the ground and gradually lose their effectiveness. This is particularly true in the case of arsenic trioxide which is converted in part at least into soluble sodium arsenite when a sodium soap is used as the emulsifier.

The preparation of the emulsion may be effected by distributing the finely powdered arsenic trioxide in melted asphalt and subsequently emulsifying the arsenized asphalt with a slurry composed of clay and water by known methods. If desired, the insoluble toxic compound may be added directly to the clay slurry before effecting emulsification, although it could also be added in the form of a paste in water to the emulsion of asphalt, water and clay. However, in order to secure the best results, it is preferred to distribute the finely divided poison in asphalt and then effect the emulsification. By such procedure I have succeeded in incorporating into the emulsion as much as 15% to 40% of arsenic trioxide, based on the asphalt content.

As a specific example by way of illustration and without any intention to limit my invention, I have succeeded in producing a satisfactory emulsion in the following manner:

Approximately 90 pounds of asphalt having a penetration of 105 at 77° F. and a softening point of approximately 100° F. were melted and approximately 10 pounds of finely powdered arsenic trioxide, but not in coloidal form, were mixed in the melted asphalt until uniformly distributed throughout the asphalt. The admixture was carried out at a temperature ranging from 200° to 300° F. This mixing should be carried out at the lowest possible temperature in order to minimize the tendency for the arsenic trioxide to settle out prior to emulsification. A neutral clay slurry was then prepared by suspending approximately 4 pounds of clay, such as bentonite, in 21 pounds of water. While I prefer to employ neutral clay, it is obvious that other types of clay having a neutral alkalinity or acidity may be used. These may be neutralized by addition of acid or alkali, depending upon the particular clay employed to control the pH value of the emulsion to give the required stability.

The clay slurry was then placed in an emulsification kettle of the vertical cylindrical type and equipped with a mixing propeller and draft tube and with a jacket surrounding the kettle. The slurry was agitated continuously while the arsenized asphalt was added slowly. The emulsification was carried out at 90 to 96° F. at which temperature the emulsification semed to proceed most smoothly. The emulsification proceeds most satisfactorily near, or a little below, the Ball and Ring softening point of the asphalt. Proper temperature control may be obtained by circulating cold water, as necessary, through the jacket surrounding the emulsification kettle. From time to time as the emulsification proceeded, more clay slurry was added, as required, to maintain the proper pasty consistency in the emulsifier and the emulsion was drawn off from time to time to maintain the proper working level in the kettle.

The final product obtained by the foregoing process is a composition based on percent by weight of 4.9% arsenic trioxide, 43.9% asphalt, 43.4% water and 7.8% clay. It has a reddish brown color and has a consistency similar to apple butter. It can be diluted in all proportions with water and can be mixed with earth or sand without difficulty from premature breaking.

While the above proportions of ingredients may be used to produce a satisfactory emulsion, it will be understood that these amounts may vary within wide limits. For example, the asphalt content of the emulsion may vary between approximately 15% and 60%. The amount of arsenic trioxide, of course, is dependent upon the effectiveness desired and for ordinary practical purposes, this amount may vary between approximately 1% and 20% of the total emulsion, although as much as 40% based on the asphalt content may be incorporated into the emulsion. The clay content will depend upon the nature of the clay employed and its treatment prior to use, i. e. neutralization with acid or alkali, and in some instances, the emulsion may contain between approximately 2% and 15% of clay. The water content of the emulsion will depend upon the consistency desired of the emulsion and may vary from not less than 35% to approximately 80%.

In the application of the poison asphalt emulsion, the mixture is applied to the ground under the structure in sufficient quantity to serve as a binder for the top layer of earth to a distance of say an inch. The top layer of earth is scarified and then mixed with the poisonous emulsion and finally rolled. If it is necessary to obtain the desired penetration of emulsion into the earth, several applications of the emulsion may be made with intermediate scarification and final rolling. Within a few hours of its application to the ground, the emulsion loses its water content, thus setting up a continuous film of asphalt in which is enclosed the clay and the arsenic trioxide. This will form a coherent layer of poisoned earth through which the termites or other pests would have difficulty in penetrating.

While the use of the poisoned asphalt emulsion has been particularly described in connection with its application to the earth under the structure, it will be observed that the same is well adapted to coating the exposed understructure for which hot asphaltic composition would not be as convenient. While no penetration into the wood itself is to be expected, the coating of asphalt emulsion has the great advantage of cheapness and a high poison content.

The present invention has been particularly described as an insecticide for combating the subterranean type of termite and as a method for producing said insecticide. However, it should be observed that the invention is not specifically limited to this use only. The insecticide may well be adapted for exterminating other insects, rats, gophers, moles and fungus growths and the same, instead of being applied to the earth, may be employed in other known manners.

The above disclosure is to be taken merely as illustrative of a preferred embodiment of my invention and is not to be considered limiting, since many variations thereof may be made within the scope of the following claims.

I claim:

1. An insecticide comprising an emulsion of asphalt, water, a substantially water insoluble toxic compound and an emulsifier, said insecticide being adapted to prevent termite infestation and said emulsion when broken forming a coherent mass or layer of asphalt and toxic compound which cannot be readily washed away by rains nor leached through the ground by soil moisture.

2. An insecticide comprising a slow breaking emulsion of asphalt, water, a substantially water insoluble toxic agent and clay in substantially neutral condition, said insecticide being adapted to prevent termite infestation and said emulsion when broken forming a coherent mass or layer of asphalt and toxic compound which cannot be readily washed away by rains nor leached through the ground by soil moisture.

3. An insecticide comprising an emulsion of asphalt, water, arsenic trioxide and clay in substantially neutral condition, said insecticide being adapted to prevent termite infestation and said emulsion when broken forming a coherent mass or layer of asphalt and toxic compound which cannot be readily washed away by rains nor leached through the ground by soil moisture.

4. An insecticide comprising an emulsion of approximately between 15% and 60% by weight of asphalt, between 2% and 15% by weight of clay, between 35% and 80% by weight of water and between 1% and 20% by weight of arsenic trioxide, said insecticide being adapted to prevent termite infestation and said emulsion when broken forming a coherent mass or layer of asphalt and toxic compound which cannot be readily washed away by rains nor leached through the ground by soil moisture.

5. An insecticide adapted to prevent termite infestation comprising an emulsion of approximately 44% by weight asphalt, 8% by weight clay, 43% by weight water and 5% by weight arsenic trioxide.

6. A process for producing an insecticide which comprises mixing finely divided water insoluble toxic compound in asphalt at a temperature above the melting point of said asphalt and emulsifying said mixture at a temperature approximating the ball and ring softening point of said asphalt with a slurry of emulsifying agent and water.

7. A process for producing an insecticide which comprises mixing finely divided water insoluble toxic compound in asphalt at a temperature above the melting point of said asphalt and emulsifying said mixture at a temperature approximating the ball and ring softening point of said asphalt with a slurry of clay and water.

8. A process for producing an insecticide which comprises mixing finely divided water insoluble toxic compound in asphalt of approximately 105 penetration and a melting point of 100° F. at a temperature ranging from 200 to 300° F. and emulsifying said mixture at a temperature below 100° F. with a slurry of clay and water.

DAVID R. MERRILL.